Jan. 13, 1925.
M. M. WOLFE
1,523,152
NURSING BOTTLE
Filed Sept. 11, 1923
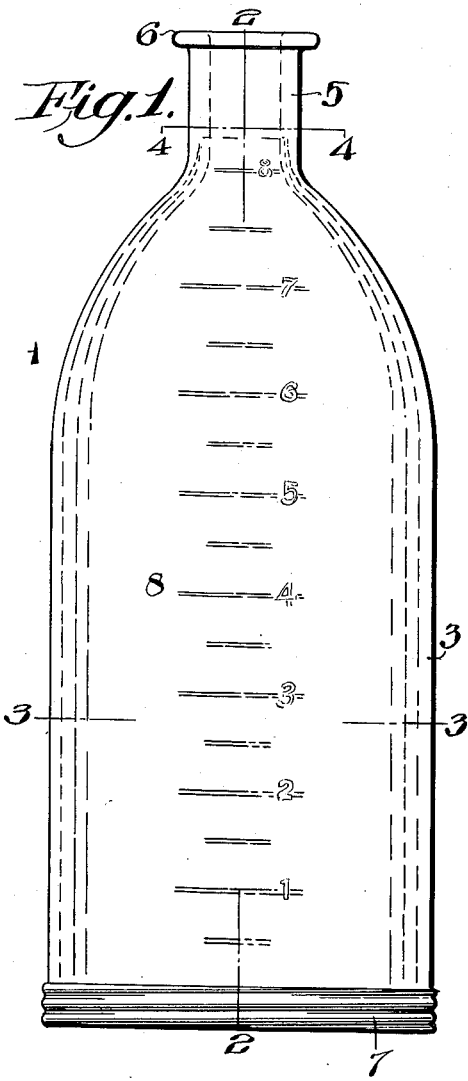
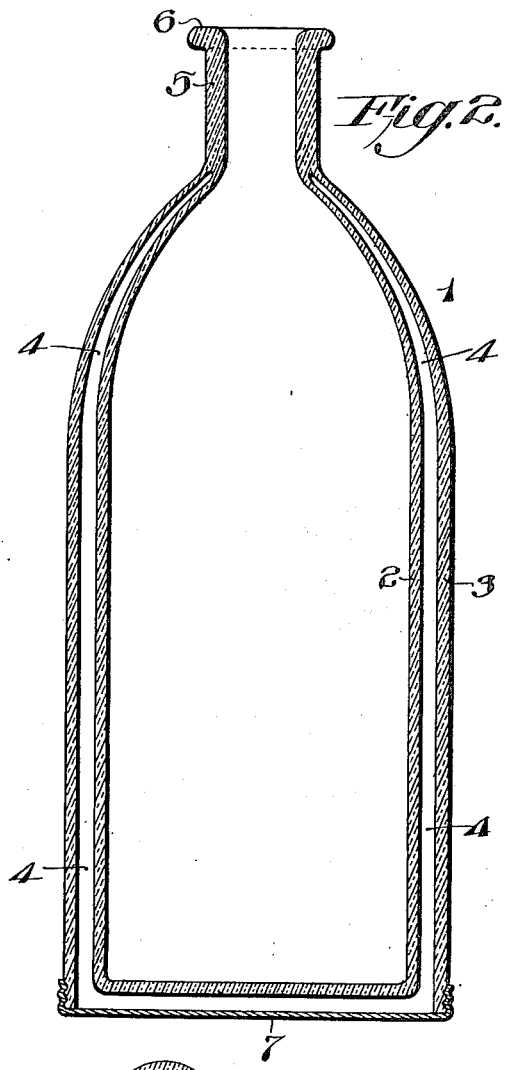
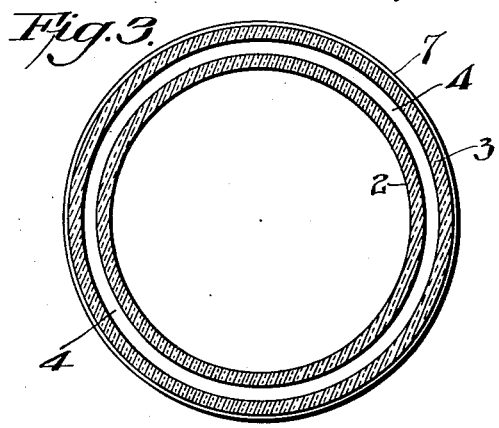
INVENTOR:
Michael M. Wolfe
BY
Giedersheim + Fairbanks
ATTORNEYS.

Patented Jan. 13, 1925.

1,523,152

UNITED STATES PATENT OFFICE.

MICHAEL M. WOLFE, OF PHILADELPHIA, PENNSYLVANIA.

NURSING BOTTLE.

Application filed September 11, 1923. Serial No. 662,030.

*To all whom it may concern:*

Be it known that I, MICHAEL M. WOLFE, a citizen of the United States, residing in the city and county of Philadelphia, State of Pennsylvania, have invented new and useful Nursing Bottles, of which the following is a specification.

My invention consists of a nursing bottle which is composed of a nursing bottle proper and an inclosing casing therefor of transparent material admitting of presenting to view the contents of the nursing bottle proper as to quantity and condition adapting also the nursing bottle proper to be heated and retain its heat for a sufficient period owing to the heating space between the inclosing casing and the nursing bottle proper, this being occasioned without the employment of a vacuum or the vacuum principle as in a thermos bottle as practiced in other article of the class. Provision is also made for integrally connecting the nursing bottle proper and the inclosing casing at the respective necks thereof, whereby there is thereat no joint that may leak at the mouth of the bottle and said necks are strongly united and so the nursing bottle proper may be firmly sustained in position in the inclosing casing.

The invention is satisfactorily illustrated in the accompanying drawing, but the important instrumentalities thereof may be varied, and so it is to be understood that the invention is not limited to the specific details shown and described, as long as they are within the scope of the claim.

Figure 1 represents a side elevation of a nursing bottle embodying my invention.

Figure 2 represents a central vertical section thereof.

Figure 3 represents a transverse section on line 3—3 Figure 1.

Figure 4 represents a transverse section on line 4—4 Figure 1.

Similar numerals of reference indicate corresponding parts in the figures.

Referring to the drawings.

1 designates my improvement in a nursing bottle, the same consisting of the glass or transparent nursing bottle proper 2 of conventional form, and the glass or transparent casing 3 which incloses the same with an existing space 4 between them for atmospheric air.

The outer wall of the neck portion of the bottle proper blends with the inner wall of the neck portion of said casing, said walls being fused together forming a single integral solid neck 5 for the two members, thus uniting firmly said portions and causing the nursing bottle proper to be suspended from said neck 5 and so sustained thereon that it will not be liable to be broken therefrom prior to and during use.

On the neck 5 is the lip 6 for the attachment of a nipple. The bottom of the casing is nomally open, thus admitting access to the space 4 and the portion of the side of the casing above said bottom is threaded for the engagement of the base cap 7 which is formed of metal or other suitable material and adapted to close said bottom and consequently said space 4.

On the sides of the nursing bottle proper are the graduations 8 for indicating the amount of milk in the said nursing bottle proper, said graduations being visible through the transparent side of the casing 3.

The operation is as follows:—

The cap 7 is removed and milk or another mixture if employed is poured into the nursing bottle proper to the extent required. The nursing bottle proper is then stoppered in any suitable manner, and the device placed in a refrigerator or cooler whereby the milk is rapidly chilled. When feeding is required, the device is removed from the refrigerator and immersed in a vessel of hot water until the desired temperature of the milk is attained, the bottom of the casing resting on that of said vessel, the hot water thus having full access to the bottom and side of the nursing bottle proper and to the space 4. Then the device is removed from the hot water and the base cap applied to the casing, thus closing the bottom of the latter whereby the nursing bottle proper retains its heat assisted by the heated air in the space 4, and so that infant may be nursed by the milk at the proper temperature to its full extent.

The stopper is, of course, removed and the nipple applied preliminary to nursing. It is evident that the mother or nurse may sterilize the nursing bottle proper preparatory to supplying it with milk, refrigerate the latter, and then heat it and after the heating operation have the milk retain its proper temperature in which condtion the infant is nursed, with the milk in a virtually protected manner.

It will be seen also that the device has a simplicity of construction without complication of parts, and the result is effected without the employement of a vacuum in the casing after the manner of a thermos bottle, as heretofore practiced, it being apparent also that both the walls of the nursing bottle and the air in the space 4 are heated by the hot water, and so the milk retains its heat for a period sufficient for nursing. Furthermore, the nursing bottle proper primarily receives the milk, is subjected to refrigeration and then to heating without the necessity of transferring the milk to another bottle to accomplish the result.

Having thus described my invention what I claim as new and desire to secure by Letters Patent, is:—

A device of the character stated comprising an inner, transparent liquid containing receptacle and an outer, transparent air containing receptacle of which the latter has an open bottom, the walls of said receptacles being spaced apart throughout the major portion of their extent and gradually converging toward their upper end to vary the cross-sectional area of said space and terminate in a single liquid pouring neck portion the walls of which are solid, said outer receptacle extending below the bottom of the inner receptacle and being exteriorly screw-threaded and a screw-threaded closure removably secured to the open bottom of said outer receptacle.

MICHAEL M. WOLFE.

Witnesses:
ALFRED H. LOREY,
JOHN A. WIEDERSHEIM.